United States Patent

Emory

[11] Patent Number: 5,919,541
[45] Date of Patent: Jul. 6, 1999

[54] FENDER COVER

[76] Inventor: Ernest H. Emory, Rte. 2 Box 255-21, Perry, Fla. 32347

[21] Appl. No.: 08/841,365

[22] Filed: Apr. 14, 1997

[51] Int. Cl.$^6$ .............................. B32B 1/06; B32B 3/06; B60R 27/00
[52] U.S. Cl. .............................. 428/76; 428/71; 428/99; 428/900; 150/166; 280/770; 211/DIG. 1
[58] Field of Search .............................. 428/71, 76, 99, 428/900, 68; 280/770; 150/166; 211/DIG. 1; 335/303

[56] References Cited

U.S. PATENT DOCUMENTS

| | | | |
|---|---|---|---|
| 3,727,658 | 4/1973 | Eldridge | 335/303 |
| 4,849,272 | 7/1989 | Haney et al. | 428/102 |
| 4,884,824 | 12/1989 | Radke | 280/770 |
| 5,290,618 | 3/1994 | Olson et al. | 428/100 |

*Primary Examiner*—Alexander Thomas
*Attorney, Agent, or Firm*—Peter Loffler

[57] ABSTRACT

A fender cover is comprised of a soft resilient layer having one or two resilient non-porous layers attached to the top or bottom of the soft layer. A plurality of spaced apart and linearly aligned magnets is attached to the fender cover for holding the fender cover to a metal surface and for holding tools and other objects that a technician may need. The distances between various magnets is non-symmetric.

20 Claims, 3 Drawing Sheets

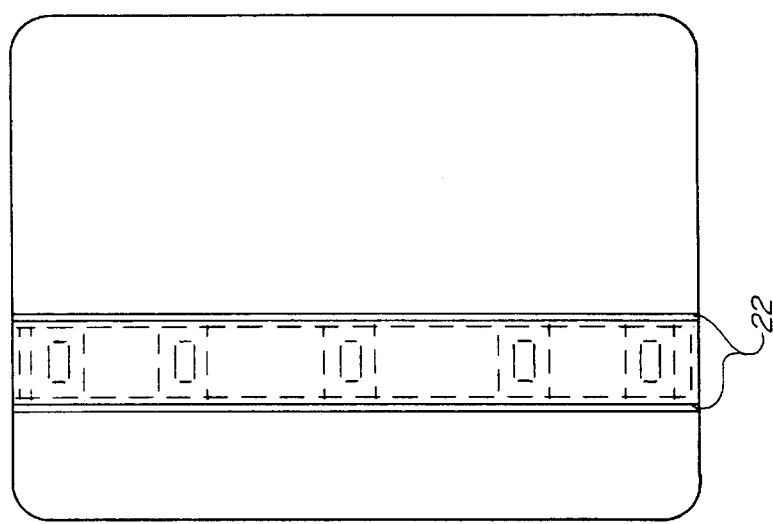
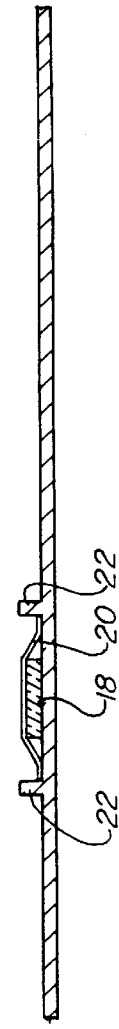

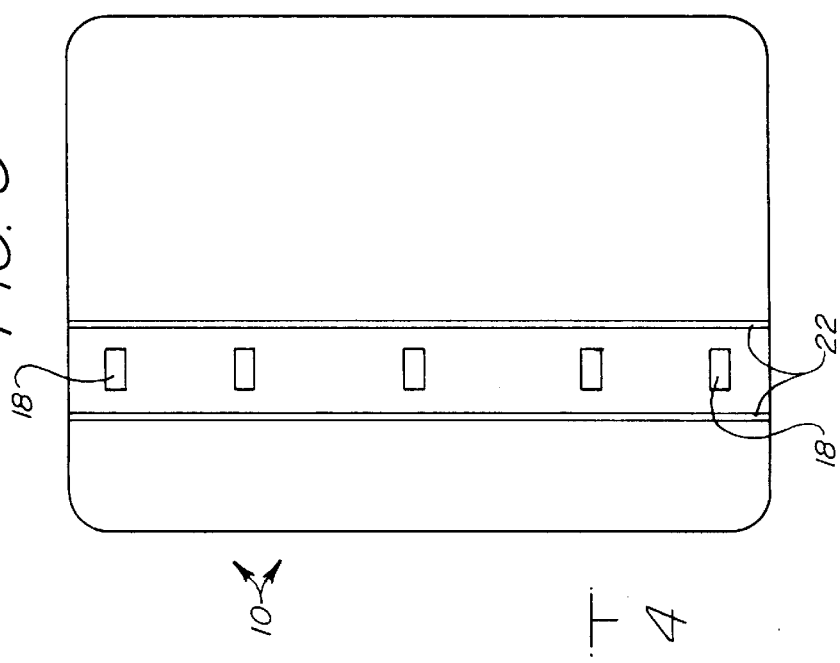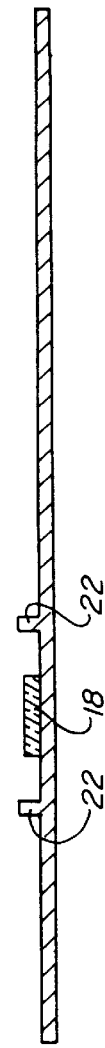

FENDER COVER

BACKGROUND OF THE INVENTION

1. Field of the Invention

The present invention relates to a fender cover having magnetic properties to hold the fender cover to its intended surface and to hold various sized tools.

2. Background of the Prior Art

In order to prevent damage to a vehicle's surface while a technician performs repairs on the vehicle, fender covers have been proposed. The fender covers are typically constructed from a soft resilient material such as foam having at least one non-porous layer. Some form of attachment means is provided in order to temporarily and removably secure the fender cover to the vehicle.

Tools and other hard objects that are found in a repair facility can cause impact damage to the vehicle's exterior surface or can damage the surface's finish. This type of contact is prevented by the soft resilient material of the fender cover. Degreasers and other chemicals can alter or even remove the painted surface of a vehicle. Vehicle contact from these materials is prevented by the non-porous layer.

SUMMARY OF THE INVENTION

The fender cover of the present invention provides for an improved fender cover having magnets for removably securing the fender cover to a metal surface. The fender cover is comprised of a soft resilient layer covered on the top, the bottom or both by a resilient non-porous layer having the ability to prevent water and chemical penetration of the fender cover. A pair of parallel creases extend along the length of the fender cover. The creases help the fender cover to be properly positioned and conformed to a standard vehicle fender. A plurality of magnets are attached to the body in linear alignment. The distances between adjacent magnets is non-symmetrical. This non-symmetry is preferred by technicians would utilize the magnets to hold tools as well as vehicle parts.

BRIEF DESCRIPTION OF THE DRAWINGS

FIG. 1 is a top plan view of the fender cover of the present invention.

FIG. 2 is a cutaway view of the fender cover taken along line 2—2 in FIG. 1.

FIG. 3 is a top plan view am alternate embodiment of the fender cover of the present invention.

FIG. 4 is a cutaway view of the fender cover taken along line 4—4 in FIG. 1.

Similar reference numerals refer to similar parts throughout the several views of the drawings.

DESCRIPTION OF THE PREFERRED EMBODIMENT

Figure 5:
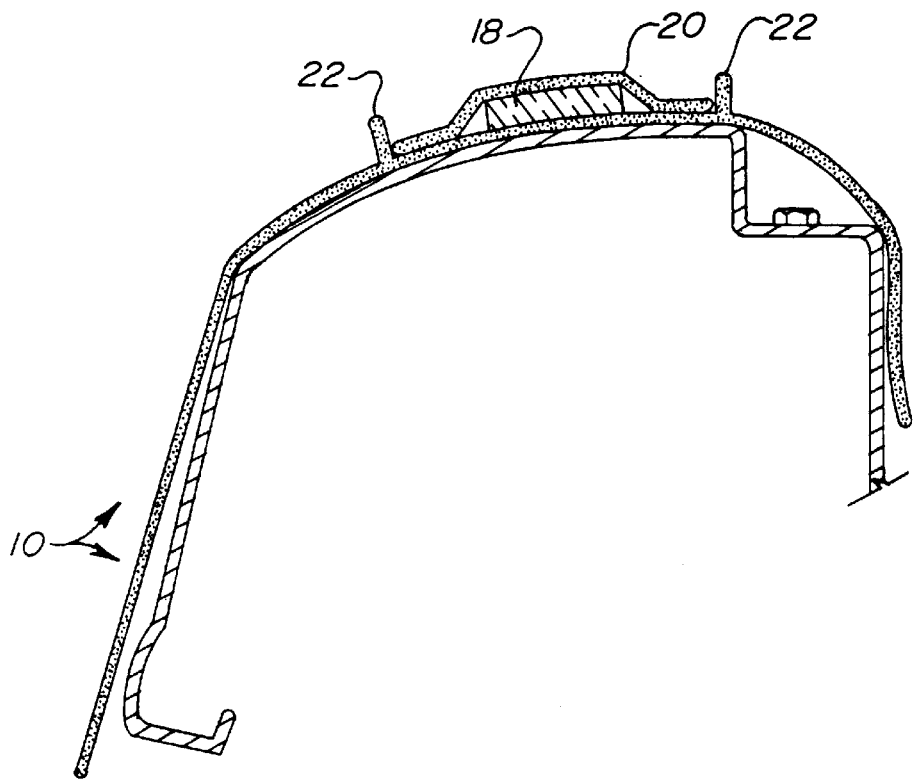
FIG. 5 is a cutaway view of the unenclosed first layer of the fender cover.
Figure 6:
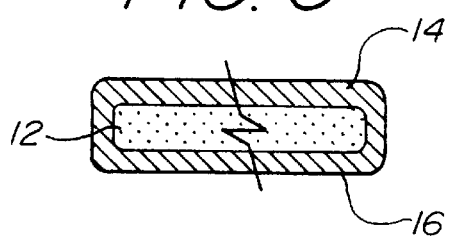
FIG. 6 is a cutaway view of the enclosed first layer of the fender cover.
Figure 7:
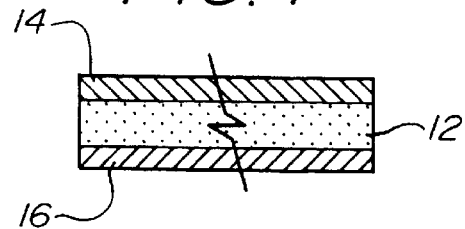
FIG. 7 is a cutaway view of the fender cover in draped over a fender cover configuration.

Referring now to the drawings, it is seen that the fender cover of the present invention, generally denoted by reference numeral 10, is comprised of a body member that has a first layer 12 having a top surface and a bottom surface and made from a soft resilient material such as foam. The first layer 12 may be generally rectangular but need not be, and may further have rounded corners but need not have rounded corners. A second layer 14 coextends with the first layer's top surface. An optional third layer 16 coextends with the first layer's bottom surface. The second layer 14 and optional third layer 16 are made from a resilient non-porous material such as vinyl and the like. The second layer 14 and the third layer 16 can each be attached, in any appropriate fashion, to the first layer 12 at their respective surfaces. Alternately, the outer periphery of the second layer 14 can be attached to the outer periphery of the third layer 16 in appropriate fashion thereby forming a pocket therebetween, with the first layer 12 being held within the pocket, as seen in FIG. 6.

As seen in FIG. 1, a plurality of permanent magnets 18, such as the five magnets shown, are positioned, in linear alignment, on the second layer 14 and affixed thereto. The top surface of each magnet 18 (that surface that does not face the second layer 14 is chamfered in order to prevent a sharp angle injury to a technician using the fender cover 10. The magnets 18 may be of any appropriate type including flexible magnets. The use of ceramic magnets has been found provide an extremely strong grip of the fender cover 10 even in a high wind environment or when a technician moves his body about the fender cover 10. The magnets 10 may be directly attached to the second layer 14 (as illustrated in FIGS. 3 and 4) or, a fourth layer 20 is attached to the second layer 14 in any appropriate fashion (as illustrated in FIGS. 1 and 2). The fourth layer 20 has a plurality of closed pockets with each pocket holding a magnet 18 therein.

As seen, a pair of raised parallel creases 22 are formed in the body member, beyond the outer boundaries of the magnets 18.

In order to utilize the fender cover 10 of the present invention, the fender cover 10 is positioned over a metal surface of a vehicle or other object such that the first layer 12, or third layer 16 if utilized, contacts the target metal surface. The creases 22 help to conform the fender cover 10 over a vehicle's fender. The magnets 18 removably secure the fender cover 10 to the metal surface. Tools and other metal objects such as nuts and bolts may be removably attached to the tops of the magnets 18 during the repair process. This provides an ideal temporary holding area for the typical items encountered during the repair process.

As seen, each magnet 18, except the center magnet if an odd number of magnets is being used, is positioned a different distance to the adjacent magnet 18 on one side that the distance to the adjacent magnet 18 on the opposite side. It has been found that technicians prefer these differing distances for temporary placement of the different tools and different parts during a typical repair job. For instance, a technician may want relatively little distance between a bolt and its accompanying washer and may want a relatively large distance between two different sized bolts. This allows the technician to recognize, the particular part that has been reached, by simply measuring, through tactile response in his fingers, the distances between two sets of parts. The differing distances between the spaced apart magnets give the technician this ability. In this differing distances arrangement of magnets 18, the use of 5 magnets with a standard size fender cover (approximately 27 inches by approximately 34 inches) is advantageous to the ergonomic environment of the technician.

While the invention has been particularly shown and described with reference to an embodiment thereof, it will be appreciated by those skilled in the art that various changes in form and detail may be made without departing from the spirit and scope of the invention.

I claim:

1. A fender cover comprising:
   a body having a first layer of relatively soft resilient material and having a top surface and a bottom surface, and a second layer of resilient non-porous material coextensive with the first layer and attached to top surface;
   a pair of parallel and linear creases extending along the length of the body;
   magnetic means; and
   attachment means attaching the magnetic means to the second layer.

2. The fender cover as in claim 1 further comprising a third layer of resilient non-porous material attached to the bottom surface.

3. The fender cover as in claim 1 wherein the magnetic means comprises a plurality of spaced apart magnets.

4. The fender cover as in claim 3 wherein the plurality of magnets are each ceramic magnets.

5. The fender cover as in claim 3 wherein the attachment means is comprised of a third layer of resilient non-porous material attached to the second layer and having a plurality of spaced apart closed pockets, each pocket holding one of the plurality of magnets.

6. The fender cover as in claim 1 wherein the magnetic means is comprised of:
   a first magnet;
   a second magnet located a first distance from and linearly aligned with the first magnet
   a third magnet located a second distance from and linearly aligned with the second magnet
   a fourth magnet located a third distance from and linearly aligned with the third magnet
   a fifth magnet located a fourth distance from and linearly aligned with the fourth magnet.

7. The fender cover as in claim 6 wherein the first distance is different than the second distance and the third distance is different than the fourth distance.

8. The fender cover as in claim 6 wherein the first magnet, the second magnet, the third magnet, the fourth magnet, and the fifth magnets are each ceramic magnets.

9. The fender cover as in claim 6 wherein the attachment means is comprised of a third layer of resilient non-porous material attached to the second layer and having a plurality of spaced apart closed pockets, each pocket holding one of the plurality of magnets.

10. A fender cover comprising:
    a first layer of resilient non-porous material, having a first outer periphery;
    a second layer of resilient non-porous material coextensive with the first layer and having a second outer periphery attached to the first outer periphery and forming a chamber therebetween;
    a third layer of relatively soft resilient material disposed within the chamber;
    magnetic means; and
    attachment means attaching the magnetic means to the first layer.

11. The fender cover as in claim 10 wherein the magnetic means comprises a plurality of spaced apart magnets.

12. The fender cover as in claim 11 wherein the plurality of magnets are each ceramic magnets.

13. The fender cover as in claim 11 wherein the attachment means is comprised of a fourth layer of resilient non-porous material attached to the first layer and having a plurality of spaced apart closed pockets, each pocket holding one of the plurality of magnets.

14. The fender cover as in claim 10 wherein the magnetic means is comprised of:
    a first magnet;
    a second magnet located a first distance from and linearly aligned with the first magnet
    a third magnet located a second distance from and linearly aligned with the second magnet
    a fourth magnet located a third distance from and linearly aligned with the third magnet
    a fifth magnet located a fourth distance from and linearly aligned with the fourth magnet.

15. The fender cover as in claim 14 wherein the first distance is different than the second distance and the third distance is different than the fourth distance.

16. The fender cover as in claim 14 wherein the first magnet, the second magnet, the third magnet, the fourth magnet, and the fifth magnets are each ceramic magnets.

17. The fender cover as in claim 14 wherein the attachment means is comprised of a third layer of resilient non-porous material attached to the second layer and having a plurality of spaced apart closed pockets, each pocket holding one of the plurality of magnets.

18. A fender cover comprising:
    a body having a first layer of relatively soft resilient material and having a top surface and a bottom surface, and a second layer of resilient non-porous material coextensive with the first layer and attached to top surface;
    a first magnet;
    a second magnet located a first distance from and linearly aligned with the first magnet
    a third magnet located a second distance, which is different than the first distance, from and linearly aligned with the second magnet
    a fourth magnet located a third distance from and linearly aligned with the third magnet
    a fifth magnet located a fourth distance, which is different than the third distance, from and linearly aligned with the fourth magnet; and
    attachment means attaching the magnetic means to the second layer.

19. The fender cover as in claim 18 wherein the attachment means is comprised of a third layer of resilient non-porous material attached to the second layer and having a plurality of spaced apart closed pockets, each pocket holding one of the plurality of magnets.

20. The fender cover as in claim 18 having a pair of parallel and linear creases extending along the length of the body.

* * * * *